No. 792,598. PATENTED JUNE 20, 1905.
C. W. KERSTETER.
VALVE FOR AUTOMATIC FIRE EXTINGUISHERS.
APPLICATION FILED AUG. 10, 1903. RENEWED NOV. 23, 1904.

2 SHEETS—SHEET 1.

No. 792,598. PATENTED JUNE 20, 1905.
C. W. KERSTETER.
VALVE FOR AUTOMATIC FIRE EXTINGUISHERS.
APPLICATION FILED AUG. 10, 1903. RENEWED NOV. 23, 1904.

2 SHEETS—SHEET 2.

Witnesses:
H. S. Gaither.
H. M. McDonell.

Inventor:
Charles W. Kersteter
by L. M. Hopkins
Att'y

No. 792,598. Patented June 20, 1905.

UNITED STATES PATENT OFFICE.

CHARLES W. KERSTETER, OF CHICAGO, ILLINOIS.

VALVE FOR AUTOMATIC FIRE-EXTINGUISHERS.

SPECIFICATION forming part of Letters Patent No. 792,598, dated June 20, 1905.

Application filed August 10, 1903. Renewed November 23, 1904. Serial No. 234,008.

*To all whom it may concern:*

Be it known that I, CHARLES W. KERSTETER, a citizen of the United States, residing at Chicago, in the county of Cook and State of Illinois, have invented certain new and useful Improvements in Valves for Automatic Fire-Extinguishers, of which the following is a specification.

The present invention relates to what is known as the "main valve" of an automatic fire-extinguisher of the dry-pipe type, the general characteristics of which are fully understood by those skilled in the art.

More particularly stated, the invention relates to that class of dry-pipe valves in which the main water-valve is held seated by the pressure of the air in the system upon the main air-valve acting through the medium of a system of levers, whereby the air-pressure is multiplied in transmission.

I am aware that a valve having these features is not broadly new, and therefore declare that the object of the present invention is to provide accessories to the parts above enumerated of improved and simplified construction.

The invention consists in the features of novelty that are hereinafter described.

Figure 1:
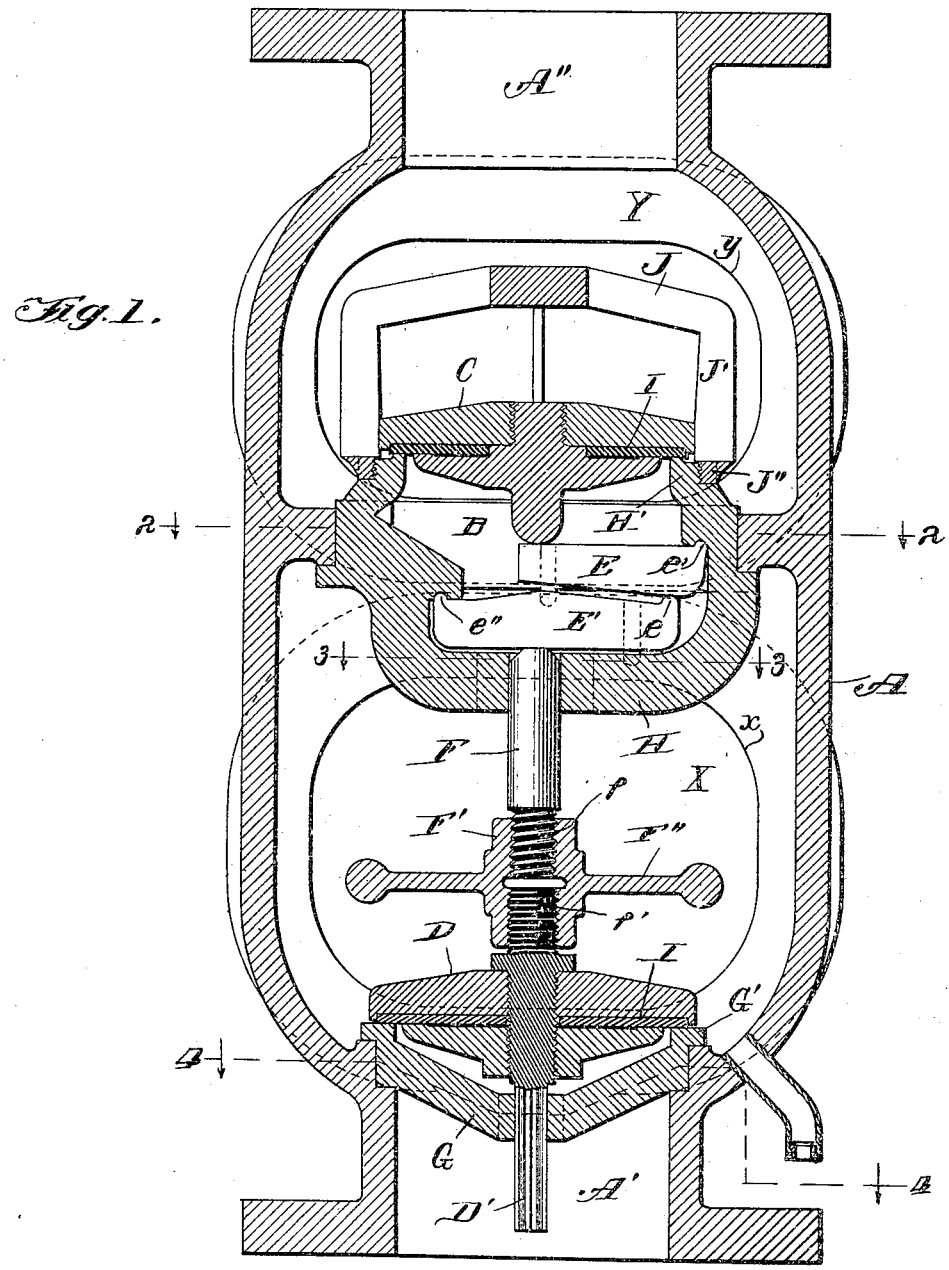
Figure 2:
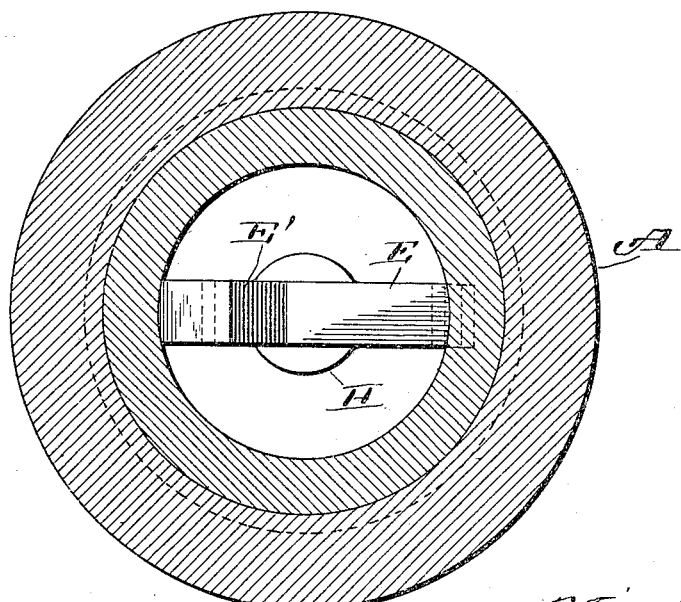
Figure 3:
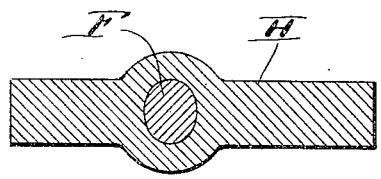
Figure 4:
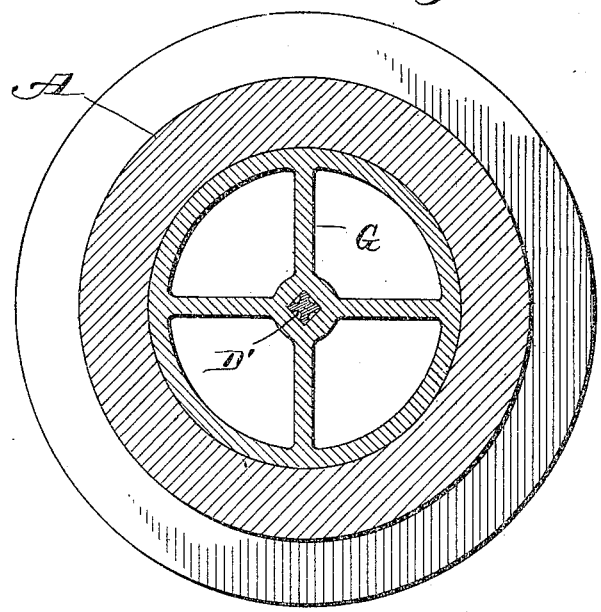

In the accompanying drawings, which are made a part of this specification, Figure 1 is a vertical section of a valve embodying the invention, the parts being shown in the positions which they occupy when the valve is set and the system is in readiness for use. Figs. 2, 3, and 4 are horizontal sections thereof on the lines 2 2, 3 3, and 4 4, respectively, Fig. 1, looking downward.

A is a casing which is provided at one end with an inlet-opening A', which communicates with the street-main or other source of water-supply, and at the other end with an outlet-opening A'', which communicates with a riser of the system. The casing has two chambers X and Y, which communicate with each other through an opening B, controlled by a valve C, hereinafter called the "air-valve." The inlet A', which opens into the chamber X, is controlled by a valve D, hereinafter called the "water-valve." The valve C is held seated by the pressure of the air against its top side and in turn holds the valve D seated through the medium of a pair of levers E and E' and an endwise-movable stem F. The valve C exerts its pressure upon one end of the lever E, which bears at *e* upon one end of the lever E', the other end of the lever E being fulcrumed at *e'* to a fixed abutment. The other end of the lever E' is fulcrumed at *e''* to a fixed abutment, and intermediate of its ends said lever bears upon the upper end of the valve-stem F. The several arms of the levers are so proportioned that the comparatively light pressure exerted upon the top of the valve C will be multiplied upon its transmission to the valve-stem F, so that the valve D will be held firmly seated, notwithstanding the heavier pressure against its under side. In order to accurately adjust the connections between the two valves, the stem F is made in two parts, the adjacent ends of which are threaded, as shown at *f* and *f'*, and are coupled by a correspondingly-threaded sleeve or nut F'. The threads are pitched in the same direction, but are differential, the threads *f* having a greater pitch than the threads *f'*. For turning the nut or sleeve F' it is provided with a hand-wheel F''. For the purpose of preventing the lower member of the stem from turning with the nut the valve D is provided on its under side with a stem D', which is square in cross-section, excepting that its sides are grooved, as shown in Fig. 4, and which passes through a square opening in a spider G. For preventing the upper member F of the stem from turning it is made of non-circular cross-section and occupies a corresponding opening in a yoke H. Preferably the stem is oval, as shown in Fig. 3, and is arranged with its major axis transverse to the lever E', with which its upper end contacts. This is for the purpose of making it impossible in assembling the parts to place the chamfered upper end of the stem parallel with the lever E, its proper position being transverse to said lever.

The seat G' for the valve D is integral with the spider G, and the seat H' for the valve C is integral with the yoke H. Each of the valves is made up of a pair of metallic clamping-disks, the upper one of which is of larger diameter, and a packing-disk I, clamped between them and projecting at its margin beyond the margin of the lower clamping-disk in order that it may have contact with its seat.

For the purpose of guiding the valve C as it is being seated and for preventing it from entering the riser or obstructing the outlet A″ it is surrounded by an open cage J. This cage is of spider-like construction and comprises three or more arms J′ and a ring J″, which has threaded engagement with the ring carrying the valve-seat H′. The vertical portions of the arms J′ are a greater distance apart at top than at bottom, so that they will permit the free movement of the valve and at the same time guide it accurately to its seat.

The casing is provided opposite the chambers X and Y with hand-holes $x$ and $y$, respectively, said holes being of sufficient size to permit the parts already described to be inserted through them.

What I claim is—

In a device of the class described, the combination of an air-valve, a seat therefor, a water-valve, a seat therefor, and means for transmitting pressure from the air-valve to the water-valve, said means including a system of levers, fixed abutments upon which they are fulcrumed, a stem and a yoke through which the stem passes, said yoke, abutments and seat for the air-valve being made in a single piece, substantially as described.

CHARLES W. KERSTETER.

Witnesses:
L. M. HOPKINS,
H. M. McDOWELL.